United States Patent
Rao et al.

(10) Patent No.: US 10,657,196 B2
(45) Date of Patent: *May 19, 2020

(54) SYSTEM AND METHOD FOR MEASURING THE VIRALITY OF INTERNET CONTENT USING INDICES

(71) Applicant: Oath Inc., New York, NY (US)

(72) Inventors: Supreeth Rao, Sunnyvale, CA (US); Aditi Sinha, Milipitas, CA (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/204,870

(22) Filed: Jul. 7, 2016

(65) Prior Publication Data

US 2016/0321281 A1 Nov. 3, 2016

Related U.S. Application Data

(63) Continuation of application No. 13/895,981, filed on May 16, 2013, now Pat. No. 9,413,834.

(51) Int. Cl.
| | |
|---|---|
| *G06F 16/958* | (2019.01) |
| *H04L 29/08* | (2006.01) |
| *G06F 16/951* | (2019.01) |
| *G06F 16/22* | (2019.01) |

(52) U.S. Cl.
CPC ........ *G06F 16/958* (2019.01); *G06F 16/2228* (2019.01); *G06F 16/951* (2019.01); *H04L 67/02* (2013.01); *H04L 67/22* (2013.01)

(58) Field of Classification Search
USPC ........................................................ 707/741
See application file for complete search history.

(56) References Cited

U.S. PATENT DOCUMENTS

| | | | |
|---|---|---|---|
| 2009/0100169 A1* | 4/2009 | Allen ...................... | H04L 12/66 709/224 |
| 2012/0324008 A1* | 12/2012 | Werz, III ............... | G06Q 30/02 709/204 |

* cited by examiner

*Primary Examiner* — Muluemebet Gurmu
(74) *Attorney, Agent, or Firm* — Cooper Legal Group, LLC

(57) ABSTRACT

A system may measure the virality of content items on a network. The virality may be measured for Internet content using indices. Indices may be generated that represent the share or news worthiness of content. An indexer may monitor the content items and generate a score which may be used to identify which content items are most likely to receive a user access request or referral from the remote server. A logic generator may display visual elements as graphical representations of the index score.

20 Claims, 12 Drawing Sheets

FIGURE. 10A

| YIRAL INDEX | YIRAL INDEX MEASURES KFACTOR AND SVINDEX IN THE CONTENT OF TOTAL TRAFFIC VOLUMES FOR SOCIAL AND SEARCH RESPECTIVELY. THIS IS AN EXPONENTIATION FUNCTION. |
|---|---|// 1002

TOP LINKS: SEARCH

| YIRALINDEX △ | URL |
|---|---|
| 16981.1321 | SPORTS.YAHOO.COM/BLOGS/NCAAF-DR-SATURDAY |
| 19912.3457 | SPORTS.YAHOO.COM/BLOGS/NBA-BALL-DONT-LIE |
| 20309.2105 | SPORTS.YAHOO.COM/NEWS/WILLIAMS-SISTERS-B |
| 21106.6325 | SPORTS.YAHOO.COM/BLOGS/NHL-PUCK-DADDY/RO |
| 23984.8866 | SPORTS.YAHOO.COM/BLOGS/SOCCER-DIRTY-TACK |
| 26576.2712 | SPORTS.YAHOO.COM/NHL-PUCK-DADDY/CH |
| 27107.445 | SPORTS.YAHOO.COM/NEWS/MICHAEL-JORDAN-APP |
| 29350.1077 | SPORTS.YAHOO.COM |
| 36834.5324 | SPORTS.YAHOO.COM/BLOGS/MMA-CAGEWRITER/MA |
| 39561.6438 | SPORTS.YAHOO.COM/BLOGS/MLB-BIG-LEAGUE-ST |
| 40091.7845 | SPORTS.YAHOO.COM/BLOGS/NBA-BALL-DONT-LIE |
| 47226.9871 | SPORTS.YAHOO.COM/GOLF/PGA/LEADERBOARD |
| 48318.4358 | SPORTS.YAHOO.COM/BLOGS/NBA-BALL-DONT-LIE |
| 79374.0797 | SPORTS.YAHOO.COM/BLOGS/NBA-BALL-DONT-LIE |
| 157735.6922 | SPORTS.YAHOO.COM/BLOGS/MLB-BIG-LEAGUE-ST |
| 234862.3853 | SPORTS.YAHOO.COM/BLOGS/NBA-BALL-DONT-LIE |
| 322117.6471 | SPORTS.YAHOO.COM/BLOGS/NCAAB-THE-DAGGER/ |
| 761557.6923 | SPORTS.YAHOO.COM/BLOGS/NFL-SHUTDOWN-CORN |
| 65693528.0899 | SPORTS.YAHOO.COM/NEWS/JORDAN-APPLIES-MAR |
| 349835704.1667 | SPORTS.YAHOO.COM/BLOGS/HIGHSCHOOL-PREP-R |

| TOP LINKS: SOCIAL | |
|---|---|
| YIRALINDEX △ | URL |
| 4166.6667 | SPORTS.YAHOO.COM/BLOGS/NBA-BALL-DONT-LIE |
| 4390.6195 | SPORTS.YAHOO.COM/BLOGS/NHL-PUCK-DADDY/RO |
| 4500 | SPORTS.YAHOO.COM/BLOGS/SOCCER-DIRTY-TACK |
| 5186.2745 | SPORTS.YAHOO.COM/BLOGS/NCAAF-DR-SATURDAY |
| 8000 | SPORTS.YAHOO.COM/BLOGS/NHL-PUCK-DADDY/RO |
| 8000 | SPORTS.YAHOO.COM/BLOGS/NHL-PUCK-DADDY/ST |
| 8184.9148 | SPORTS.YAHOO.COM/NEWS/WHY-OAKLAND-RAIDER |
| 9000 | SPORTS.YAHOO.COM/BLOGS/NASCAR-FROM-THE-M |
| 9846.6112 | SPORTS.YAHOO.COM/BLOGS/SOCER-DIRTY-TACK |
| 10731.4753 | SPORTS.YAHOO.COM/THE-TURNSTILE/WWE |
| 12500 | SPORTS.YAHOO.COM/TOP/NEW?SLUG=YCN-10668 |
| 15210.5263 | SPORTS.YAHOO.COM/BLOGS/MLB-BIG-LEAGUE-ST |
| 15923.5669 | SPORTS.YAHOO.COM/BLOGS/NHL-PUCK-DADDY/MA |
| 16000 | SPORTS.YAHOO.COM/NCAAF-DR-SATURDAY |
| 16000 | SPORTS.YAHOO.COM/SOCCER-DIRTY-TACK |
| 16000 | SPORTS.YAHOO.COM/SOCCER-DIRTY-TACK |
| 16071.4286 | SPORTS.YAHOO.COM/BLOGS/NASCAR-FROM-THE-M |
| 19692.3077 | SPORTS.YAHOO.COM/BLOGS/NCAAF-DR-SATURDAY |
| 40333.3333 | SPORTS.YAHOO.COM/BLOGS/OLYMPICS-FOURTH-P |
| 46512.5 | SPORTS.YAHOO.COM/BLOSG/NHI-PUCK-DADDY/ST |

| LEAST VIEWED LINKS: SEARCH | |
|---|---|
| YIRALINDEX △ | URL |
| 1.3592 | SPORTS.YAHOO.COM/BLOGS/OLYMPICS-FOURTH-P |
| 2.3923 | SPORTS.YAHOO.COM/NEWS/BUCKEYES-BACK-UNDE |
| 2.3923 | SPORTS.YAHOO.COM/_REMOTE/?M_ID=MEDIAREMO |
| 3.5971 | SPORTS.YAHOO.COM/BLOGS/FANTASY-ROTO-ARCA |
| 3.8911 | SPORTS.YAHOO.COM/_REMOTE/?M_ID=MEDIAREMO |
| 3.9526 | SPORTS.YAHOO.COM/_REMOTE/?M_ID=MEDIAHEAD |
| 4.0816 | SPORTS.YAHOO.COM/_REMOTE/?M_ID=MEDIAREMO |
| 4.8077 | SPORTS.YAHOO.COM/NEWS/SYRACUSE-SAYS-TWEE |
| 6.4673 | SPORTS.YAHOO.COM/BLOGS/NCAAB-THE-DAGGER/ |
| 7.9365 | SPORTS.YAHOO.COM/_REMOTE/?M_ID=MEDIAREMO |
| 8.8496 | SPORTS.YAHOO.COM/BLOGS/NFL-SHUTDOWN-CORN |
| 9.0704 | SPORTS.YAHOO.COM/BLOGS/SOCCER-DIRTY-TACK |
| 9.093 | SPORTS.YAHOO.COM/BLOGS/NBA-BALL-DONT-LIE |
| 9.4443 | SPORTS.YAHOO.COM/BLOGS/MLB-BIG-LEAGUE-ST |
| 10.4823 | SPORTS.YAHOO.COM/BLOGS/NBA-BALL-DONT-LIE |
| 11.236 | SPORTS.YAHOO.COM/VIDEO/FATHER-SON-RELIVE |
| 13.8889 | SPORTS.YAHOO.COM/NBA/PLAYERS/4942 |
| 14.4928 | SPORTS.YAHOO.COM/BLOGS/TENNIS-BUSTED-RAC |
| 15.444 | SPORTS.YAHOO.COM/NEWS/49ERS-RELEASE-6-TI |
| 16.5995 | SPORTS.YAHOO.COM/BLOGS/NBA-BALL-DNOT-LIE |

FIGURE. 11B

| LEAST VIEWED LINKS: SOCIAL | |
|---|---|
| YIRALINDEX △ | URL |
| 0 | SPORTS.YAHOO.COM/BLOGS/SOCCER-DIRTY-TACK |
| 0 | SPORTS.YAHOO.COM/BLOGS/MLB-BIG-LEAGUE-ST |
| 0 | SPORTS.YAHOO.COM/BLOGS/NASCAR-FROM-THE-M |
| 0 | SPORTS.YAHOO.COM/BLOGS/HIGHSCHOOL-PREP-R |
| 0 | SPORTS.YAHOO.COM/BLOGS/NASCAR-FROM-THE-M |
| 0 | SPORTS.YAHOO.COM/BLOGS/HIGHSCHOOL-PREP-R |
| 0 | SPORTS.YAHOO.COM/BLOGS/NBA-BALL-DNOT-LIE |
| 0 | SPORTS.YAHOO.COM/BLOGS/NBA-BALL-DNOT-LIE |
| 0 | SPORTS.YAHOO.COM/BLOGS/NASCAR-FROM-THE-M |
| 0 | SPORTS.YAHOO.COM/BLOGS/NBA-BALL-DNOT-LIE |
| 0 | SPORTS.YAHOO.COM/BLOGS/NBA-BALL-DNOT-LIE |
| 0 | SPORTS.YAHOO.COM/BLOGS/NCAAF-DR-SATURDAY |
| 0 | SPORTS.YAHOO.COM/PHOTOS/FANS-INJURED-BY- |
| 0 | SPORTS.YAHOO.COM/NFL/BLOG/SHUTDOWN_CORNE |
| 0 | SPORTS.YAHOO.COMBLOGS/MMA-CAEWRITER/POS |
| 0 | SPORTS.YAHOO.COM/BLOGS/NFL-SHUTDOWN-CORN |
| 0 | SPORTS.YAHOO.COM/BLOGS/NCAAF-DR-SATURDAY |
| 0 | SPORTS.YAHOO.COM/BLOGS/NASCAR-FROM-THE-M |
| 0 | SPORTS.YAHOO.COM/BLOGS/SOCCER-DIRTY-TACK |
| 0 | SPORTS.YAHOO.COM/BLOSG/NASCAR-FROM-THE-M |

SYSTEM AND METHOD FOR MEASURING THE VIRALITY OF INTERNET CONTENT USING INDICES

CROSS-REFERENCE TO RELATED APPLICATIONS

This application is a continuation of U.S. patent application Ser. No. 13/895,981, filed May 16, 2013, and titled "System and Method for Measuring the Virality of Internet Content Using Indices," the contents of which is hereby incorporated by reference in its entirety.

TECHNICAL FIELD

The present description relates generally to a system and method, generally referred to as a system, for measuring the virality of Internet content using indices. More specifically, the present description relates to a system for generating indices representing the performance, share worthiness, and/or news worthiness of content items which may be found in the Internet.

BACKGROUND

The evolution and development of electronic technology and data transfer systems allow more users to interact with each other faster and more often. Extraordinary amounts of information and data are shared electronically at a nearly continuous rate. Users may post or send information or data of interest to others whenever and as often as the user chooses. The Internet provides users with access to various types of web content, such as web pages and other web documents or articles. For instance, the Internet may enable users to view articles or reports on a multitude of topics including, among other things, news reports (e.g., local, national, and world), weather reports, sports articles, reference material, financial content, social media, and other categories of information. Due to the large amount of information available on the Internet, various tools, such as search engines, have been developed to help users find web content pertaining to a particular topic. Search engines may enable users to search web content by keyword. For example, in response to receiving a keyword from a user, a search engine may return a list of web pages that relate to the keyword. In this way, search engines may enable a user to quickly locate and retrieve particular content items associated with specific search topics of interest.

In some cases, an amount of web content, such as web pages and other web documents, may collectively provide insight into web activity associated with particular topics. For example, a large number of web pages with references to a particular search topic (e.g., a new book or movie) may indicate a high level of web activity for the search topic. Similarly, a small number of web pages with references to a particular search topic may indicate a low level of web activity for the search topic. However, search engines and other tools for finding information on the Internet may not provide advertisers and other users with sufficient indications of trends in user accesses of particular content items. Moreover, search engines and other tools do not provide users or web site providers with up-to-date indications of the performance, or news or share worthiness, of content items.

Online advertising has become an important source of revenue for enterprises engaged in electronic commerce. Processes associated with technologies such as Hypertext Markup Language (HTML) and Hypertext Transfer Protocol (HTTP) enable a web page to be configured to display advertisements. Those advertisements may be targeted based on a user's preferences. In addition to advertisements, other material and resources on a web page may also be targeted for a particular user. In certain situations, it may be difficult to identify a user and/or obtain knowledge regarding that user. In these situations, and in others, it may be preferential to associate an advertisement directly with a particular content item.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIGS. 10A-B show an exemplary graphical representation of the highest performing index measurements of content items within a property classification.

FIG. 11A-B show an exemplary graphical representation of the lowest performing index measurements of content items within a property classification.

DETAILED DESCRIPTION

Figure 1:
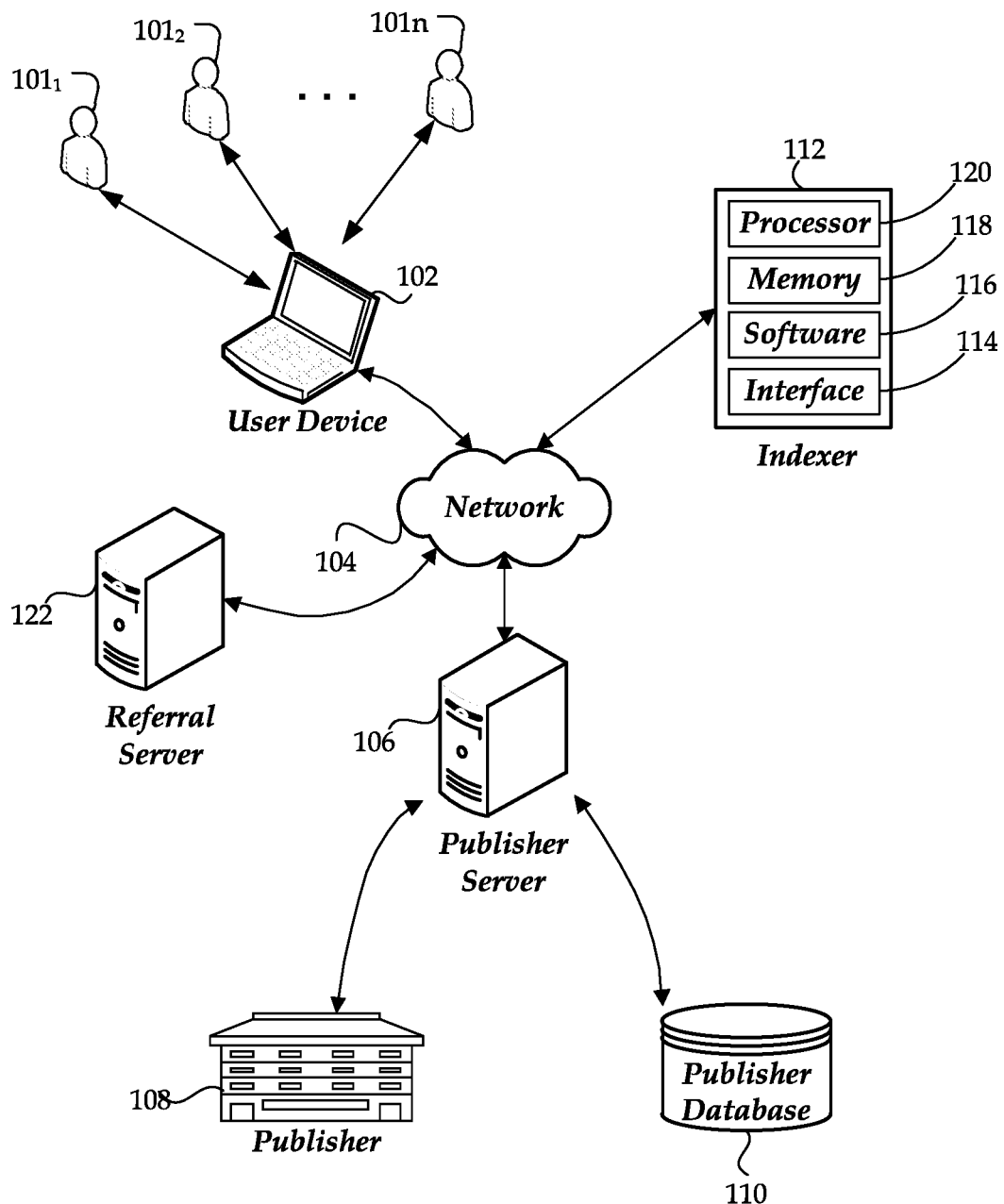
FIG. 1 is a block diagram of an exemplary network system.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrases "in another embodiment" or "in further embodiments" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors By way of introduction, communications technologies allow consumers, businesses, advertisers, and other organizations (generally referred to herein as "users") to rapidly exchange information, data, and ideas. Users may transmit, receive, or otherwise share content through or using a variety of electronic media, networks, and formats. "Content item," as used herein, generally refers to web content that may be displayed on a web page or otherwise accessed and viewed by a user. Content items may take a wide range of formats, and may include, among other things, web documents, articles, search results, social blogs, news reports (e.g., local, national, and world), weather reports, sports articles, reference material, financial content, social media content, as well as other sources of information.

Search engines have traditionally been used to help users find content pertaining to a particular topic of interest. Similarly, social media websites now provide a platform allowing users to search, find, review, edit, post, and share content items with other users in their social network. Other users within the social network of a particular user, whether it be a limited network of associated users or an open network, are likewise able to view, edit, and re-post content items that were previously shared by other members within, or even outside of, the network. Moreover, many websites across the Internet display content items side-by-side easily accessible hyperlinks that allow users to quickly share those content items directly on their respective social networks. For instance, a user of a social network may navigate to an article hosted on a third-party website, such as ESPN.com or NYTIMES.com. The user may read the article and decide to share it on a social network, either via a quick-link on the page displaying the article, or by directly copying the article unique resource locator (URL) into the social network interface, thereby allowing the content to be shared within the social network. Other users within the social network may then access, view, and re-post the content their own social network.

As content items receive more views, and in turn receive more shares within various social networks or gains, the content item may reach a point where the content goes viral and exponentially increases in user access requests. As used herein, "viral" refers to a social phenomenon in which a driving force, such as appeal or general interest, induces users to replicate, or otherwise engage in, an action that causes a content item to be shared with or distributed to other users, thereby causing the idea or content item to be spread among or accessed by a large numbers of users in a relatively short period of time. At any stage of the process, user access requests may come from large variety of sources, including, but not limited to, from links within a social network, explicit shares of the content item with one or more users (e.g. via a hyperlink on the web page or within the social network), or from users clicking on the results displayed from keyword searches on a search engine. At any rate, a content item that goes viral is more likely to be accessed by and shared with other users than a content item that has been accessed by comparatively fewer users.

Given the growth and importance of online advertising as a source of revenue for enterprises engaged in electronic commerce, online advertisers may benefit from associating their advertisements with content items that have gone viral. Specifically, in instances where the social attributes of a user are difficult to determine, it may be particularly beneficial to associate advertisements with content items, and even more beneficial to associate advertisements with content items that have gone viral. Moreover, website producers may benefit from tailoring their editorial content to reflect the trends in Internet user behavior, including, for example, displaying those articles which have gone viral on a landing or homepage in order to attract more users. Historically, so-called viral marketing was forced to rely on word-of-mouth communication and interaction between internet users to achieve increases in brand awareness or other marketing objectives. In the present day, the growth in use of the Internet to view articles and other content items, as well as the expansion in social networking, has caused marketers to rely on the network effects of the Internet to reach consumers with advertisements.

The present disclosure is directed to allowing users, including website providers and advertises, to more efficiently track and monitor trends in user access requests to content items. Using the Internet, a number of users may access various content items on websites hosted on various servers. An indexing mechanism is provided that may monitor user access to content items in order to identify value rankings or indices for those content items. The indices may be utilized by users to indicate performance of respective content items, including virality and/or share or news worthiness. For example, the indexing mechanism may identify a quantity of access requests to a content item originating from a given source, such as a social network or search engine. The indexing mechanism may consider the proportionality of views originating from the source as they relate to access requests from other sources in order to generate an index score reflecting the behavior of users on the Internet. For example, in one embodiment, the indexing mechanism may generate an index score in accordance to the method further described in connection with FIG. 5.

The index score may then be graphically represented to facilitate efficient analysis of the behavior of Internet users, as further described in connection with FIG. 6. An advertiser or webpage host may utilize the indexing mechanism and/or graphical representations to, for example, determine which content items are particularly likely to be viewed by users or to receive explicit shares on social networks, and thus would be good targets for advertisements. Additionally, a webpage host may further utilize the indexing mechanism to determine which content items should be deemed more newsworthy and, for example, should therefore be displayed on homepages or landing pages in order to attract greater user traffic. Many potential uses for the indexing mechanism and/or graphical representation thereof are envisioned, and the examples herein are intended to be non-limiting examples.

An indexer may be operable to generate an index of content, including associated contextual content, such as for one or more databases, which may be searched to locate content, including contextual content. An index may include index entries, wherein an index entry may be assigned a value referred to as a weight. An index entry may include a portion of the database. In some embodiments, an indexer may use an inverted index that stores a mapping from content to its locations in a database file, or in a document or a set of documents. A record level inverted index contains a list of references to documents for each word. A word level inverted index additionally contains the positions of each word within a document. A weight for an index entry may be assigned. For example, a weight, in one example embodiment may be assigned substantially in accordance with a difference between the number of records indexed without the index entry and the number of records indexed with the index entry.

A search engine may enable a device, such as a client device, to search for files of interest using a search query. Typically, a search engine may be accessed by a client device via one or more servers. A search engine may, for example, in one illustrative embodiment, comprise a crawler component, an indexer component, an index storage component, a search component, a ranking component, a cache, a profile storage component, a logon component, a profile builder, and one or more application program interfaces (APIs). A search engine may be deployed in a distributed manner, such as via a set of distributed servers, for example. Components may be duplicated within a network, such as for redundancy or better access.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below.

Referring now to the figures, FIG. 1 depicts a block diagram illustrating one embodiment of an exemplary network system 100. The network system 100 may provide a platform for indexing, or measuring the virality or news worthiness of, content items by analyzing user access request data for a particular content item. In the network system 100, a user device 102 is coupled with a publisher server 106 through a network 104. The publisher server 106 may be operated by and/or coupled with a publisher 108, as well as coupled with a publisher database 110. A user device 102 may also be coupled with a referral server 122 through the network 104. An indexer 112 may be coupled with the publisher server 106 and/or the referral server 122. Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The user device 102 may be a computing device which allows a user 101 to connect to a network 104, such as the Internet. A user 101, which may be a consumer, accesses a web page via the network 104. The accessed page may include one or more content items, such as articles or products, and may provide tracking information for an advertiser to target. The user device 102 may also be referred to as a client device and may include a computing device capable of sending or receiving signals, such as via a wired or a wireless network (e.g. the network 104, which may be the Internet). The user device 102 may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. The user device 102 may vary in terms of capabilities or features, particularly with regard to display size and aspect ratio. The different display sizes and aspect ratios for different user devices may result in an advertisement being rendered differently for those particular user devices. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

The user device 102 may include or may execute a variety of operating systems, including a personal computer operating system, such as a WINDOWS®, MAC OS X®, UNIX®, IOS®, or LINUX®, or a mobile operating system, such as IOS®, ANDROID®, or WINDOWS MOBILE®, or the like. The user device 102 may include or may execute a variety of possible applications, such as a client software application enabling communication with other devices, such as communicating one or more messages, such as via email, short message service (SMS), or multimedia message service (MMS), including via a network, such as a social network, including, for example, FACEBOOK®, LINKEDIN®, TWITTER®, FLICKR®, or GOOGLE+®, to provide only a few possible examples. The user device 102 may also include or execute an application to communicate content, such as, for example, textual content, multimedia content, or the like. The user device 102 may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities. As described below, the user device 102 views a content item page that includes multiple functionality that may be monitored by the advertiser 124.

In one embodiment, the user device 102 is configured to request and receive information from a network (e.g. the network 104, which may be the Internet). The information may include web pages with advertisements. The user device 102 may be configured to access other data/information in addition to web pages over the network 104 using a web browser, such as INTERNET EXPLORER® (sold by Microsoft Corp., Redmond, Wash.) or FIREFOX® (provided by Mozilla). In an alternative embodiment, software programs other than web browsers may also display pages received over the network 104 or from a different source. As described below, content item pages may include numerous features and advertisements on a single page that may be monitored in real time.

In one embodiment, the publisher server 106 provides an interface to a network 104 and/or provides its web pages over the network, such as to the user device 102. The publisher server 106 may be a web server that provides the user device 102 with pages (including articles or product search results) that are requested over the network, such as by a user of the user device 102. In particular, the publisher 108 may provide a web page, or a series of web pages that are provided by the publisher server 106 when requested from the user device 102. The content provided by the publisher server 106 may be targeted depending on the user 101 that is operating the user device 102. Additionally, the content may be targeted based on a virality index or measure of the content item's performance and/or share or newsworthiness, as described below. The publisher server 106 may be operated by a publisher 108 that maintains and oversees the operation of the publisher server 106. The publisher 108 may be any operator of a page displaying advertisements that receives a payment from the advertisers of those advertisements. The publisher 108 may receive payment from advertisers based on a per view basis. In one embodiment, a page may include a content item that is accessed by a user, such as an article or report or any other information that may be accessed and/or shared by users within a network.

The publisher database 110 may be coupled with the publisher server 106 and may store the publisher's pages or data that is provided by the publisher server 106. The stored data may include, for example, articles or product information, as well as data analyzing the articles or products for display on the page when a user accesses the page. The article page and/or product pages may also display one or more advertisements. The advertisements may be displayed on web pages (e.g. product pages or news articles), such as the publisher's pages.

The user device 102 may also access a web page, or the series of web pages, that are provided by the publisher server 106 via a referral server 122. A referral server 122 may be a web server that provides the user device 102 with pages that are requested over the network 104. The pages provided by the referral server 122 may include URLs or hyperlinks to content items, such as to pages displaying articles or product information. In one embodiment, a referral server 122 may be a search engine server that may yield a page of links to content items along with images, price, and/or reviews as a result of a keyword search. A user may click the links to be referred to the data or pages provided by the publisher server 106. In another embodiment, a referral server 122 may be a social network server. The pages served by the social network server may include ways for users to share links to content items, such as pages displaying articles or product information displayed. Additionally, pages that are provided by the publisher server 106 may include links within the page that allow a user to quickly share the page on social network server via network 104.

The publisher server 106 and/or the referral server 122 may be one or more computing devices which may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary in configuration or capabilities, but generally a server may include one or more central processing units and memory. A server may also include one or more mass storage devices, one or more power supplies, one or more wired or wireless network interfaces, one or more input/output interfaces, or one or more operating systems.

In addition, the publisher server 106 and/or the referral server 122 may be or may be part of a content server. A content server may include a device that includes a configuration to provide content via a network to another device. A content server may, for example, host a site, such as a social networking site, or a personal user site (such as a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc.

The indexer 112 may generate an index or measurement indicating the virality or share worthiness of a content item. In addition, the indexer 112 may be further configured to generate a page with a number of elements that allow users to view and organize information about the virality index or measurement. In one embodiment, the indexer 112 may be controlled by the publisher 108 and may be a part of the publisher server 106. In another embodiment, the indexer 112 may be controlled by the referral server 122 and may be a part of the referral server 122. Alternatively, the indexer 112 may be part of a separate entity. The indexer 112 may receive elements from the referral server 122 and/or the publisher server 106 that are used as part of a product page or a product search result page. The indexer 112 is further described with respect to FIG. 2.

The indexer 112 may be a computing device for generating a product or graphic display page with a plurality of elements and for monitoring user interaction with those elements and the page. The indexer 112 may include a processor 120, memory 118, software 116 and an interface 114. The indexer 112 may be a separate component from the publisher server 106 and/or the referral server 122, or may be combined as a single component or device.

The interface 114 may communicate with any of the user device 102, the publisher server 106, and/or the referral server 122. The interface 114 may include a user interface configured to allow a user and/or administrator to interact with any of the components of the indexer 112. For example, the administrator and/or user may be able to monitor user interaction with a content item page and generate an index associated with that content item page.

The processor 120 in the indexer 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program, such as code generated manually (i.e., programmed).

The processor 120 may be coupled with a memory 118, or the memory 118 may be a separate component. The interface 114 and/or the software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded ad or user data. Examples include a hard drive, compact disc (CD), digital video disc (DVD), memory card, memory stick, floppy disc, universal serial bus (USB) memory device, or any other device operative to store ad or user data. The memory 118 is operable to store instructions executable by the processor 120.

The functions, acts or tasks illustrated in the figures or described herein may be performed by the programmed processor executing the instructions stored in the memory 118. The functions, acts, or tasks are independent of the particular type of instruction set, storage media, processor or processing strategy and may be performed by software, hardware, integrated circuits, firm-ware, micro-code, and the like, operating alone or in combination. Likewise, processing strategies may include multiprocessing, multitasking, parallel processing and the like. The processor 120 is configured to execute the software 116. The software 116 may include instructions for generating a product page with a plurality of elements and for monitoring user interaction with that page and the elements.

The interface 114 may be a user input device or a display. The interface 114 may include a keyboard, keypad or a cursor control device, such as a mouse, or a joystick, touch screen display, remote control or any other device operative to interact with the indexer 112. The interface 114 may include a display coupled with the processor 120 and configured to display an output from the processor 120. The display may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing input parameters.

The present disclosure contemplates a computer-readable medium that includes instructions or receives and executes instructions responsive to a propagated signal, so that a device connected to a network can communicate voice, video, audio, images or any other data over a network. The interface 114 may be used to provide the instructions over the network via a communication port. The communication port may be created in software or may be a physical connection in hardware. The communication port may be configured to connect with a network, external media, display, or any other components in network system 100, or combinations thereof. The connection with the network may be a physical connection, such as a wired Ethernet connection or may be established wirelessly as discussed below. Likewise, the connections with other components of the network system 100 may be physical connections or may be established wirelessly. Any of the components in the network system 100 may be coupled with one another through a network, including but not limited to the network 104. For example, the indexer 112 may be coupled with the publisher server 106 and/or the referral server 122 through a network. Accordingly, any of the components in the network system 100 may include communication ports configured to connect with a network, such as the network 104.

The network (e.g. the network 104) may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example. As described herein, the network 104 may be the Internet, which is merely one example of a network.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

The network connecting the devices described above (e.g. the network 104) may be a "content delivery network" or a "content distribution network" (CDN). For example, the publisher server 106 and/or the referral server 122 may be part of a CDN. A CDN generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Likewise, the network connecting the devices described above (e.g. the network 104) may be a peer-to-peer (or P2P) network that may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server." For example, the referral server 122 or the publisher server 106 may provide advertisements and/or content to the user device 102 over a P2P network, such as the network 104.

The publisher server 106, the publisher database 110, the indexer 112, the referral server 122, and/or the user device 102 may represent computing devices of various kinds. Such computing devices may generally include any device that is configured to perform computation and that is capable of sending and receiving data communications by way of one or more wired and/or wireless communication interfaces, such as interface 114. For example, the user device 102 may be configured to execute a browser application that employs HTTP to request information, such as a web page, from the publisher server 106. The present disclosure contemplates the use of a computer-readable medium that includes instructions or receives and executes instructions responsive to a propagated signal, so that any device connected to a network can communicate voice, video, audio, images or any other data over a network.

Figure 2:
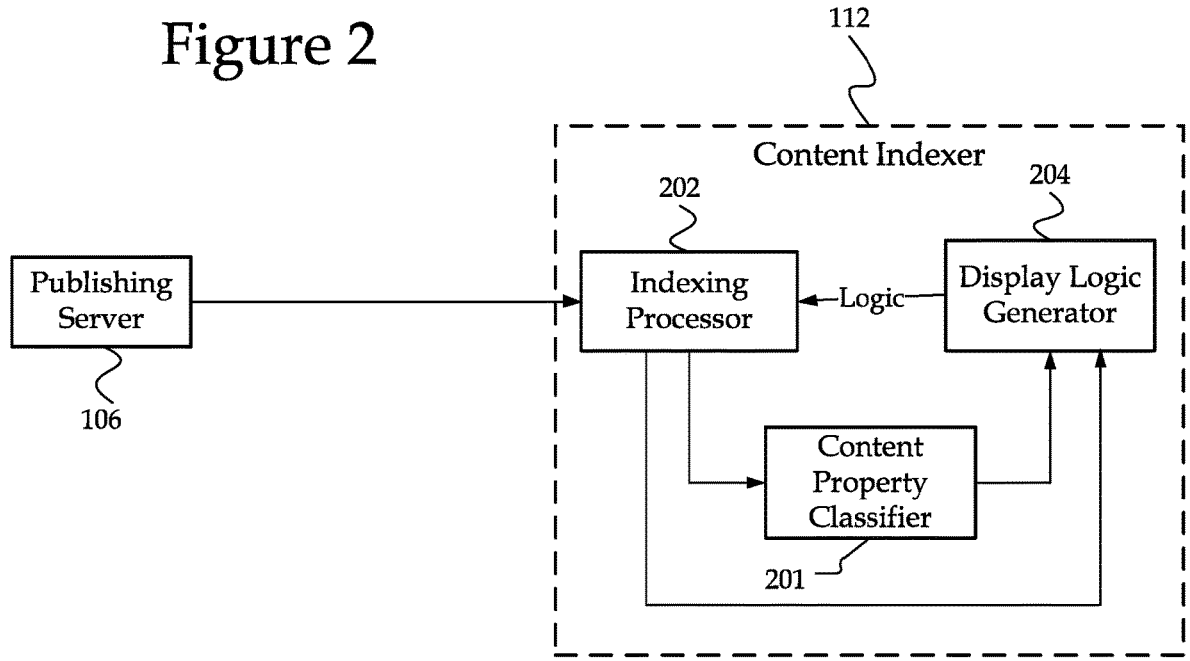
FIG. 2 is a block diagram of an exemplary content item indexer.

FIG. 2 is a diagram of an exemplary indexer 112. The indexer 112 may include an indexing processor 202, which may include or be the same as the processor 120 discussed above. The indexer 112 may further include a display logic generator 204 and/or a content property classifier 201. The publisher server 106 may provide the content indexer 112 with access to a content item such that the indexer may monitor user access requests to the content item. The indexing processor 202 receives data regarding the content item from publishing server 106 for generating a display logic relating to the performance or virality or newsworthiness of the content item. The indexing processor 202 may analyze user interaction with the content item to create an index. The display logic generator 204 may generate logic used to create graphical representations of the indices.

In one embodiment, the content indexer 112 may use the content property classifier 201 to determine a content property classification 301 associated with the content item received from publishing server 106. Exemplary content property classifications 301 are further described below with respect to FIG. 3. In another embodiment, the display logic generator 204 may use the content property classification 301 to generate property-specific display logic for the index. For example, the content property classifier 201 may indicate that the content is related to the sports 304 property. In this scenario, the display logic generator 204 may generate display logic with graphical representations in relation to other content items within the sports 304 property.

Figure 3:
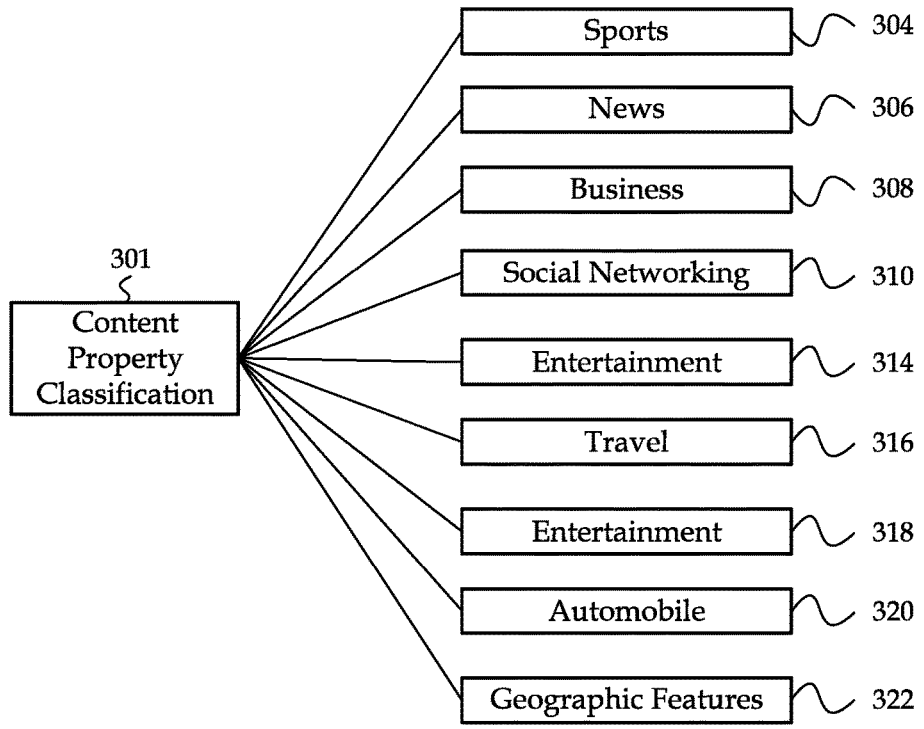
FIG. 3 is a diagram of exemplary characteristics for property classifications.

FIG. 3 is a diagram of exemplary content property classifications 301 for a content item, such as pages containing, for example, articles, reports, or product information. The content property classifications 301 may include features or components that are part of a content item. One or more of the classifications 301 may be determined based on information received from the publisher server 106 or referral server 122 and/or determined by the content property classifier 201. In one embodiment, the content indexer 112 may utilize one or more property classifications 301 to generate property classification specific display logic. In certain embodiments, there may be one or more classifications 301 displayed as part of a single page that allow a user to retrieve a set of indices related to content items sharing the selected classification by clicking on the classification. In alternative embodiments, there may be additional or fewer classifications 301 displayed as part of a single page and the elements 301 shown in FIG. 3 are merely exemplary and are non-exhaustive.

Figure 4:
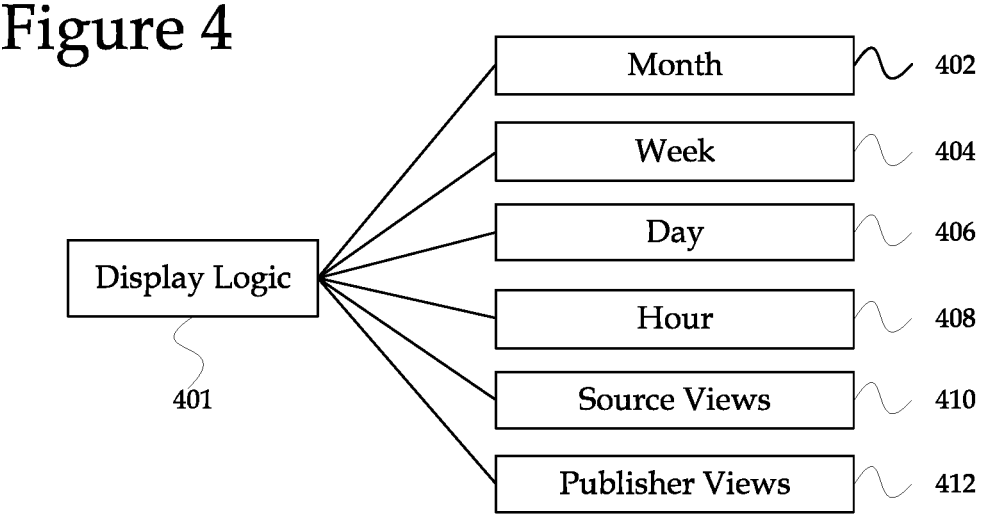
FIG. 4 is a diagram of exemplary characteristics used by the display logic for ordering indices.

FIG. 4 is a diagram of exemplary display logic 401 which may be utilized by display logic generator 204. The content indexer 112 may generate and display indices having a certain characteristic or sort indices by a given characteristic. In one embodiment, the content indexer 202 may receive a request to generate and display indices based on data for the last month 402 or day 406. In another embodiment, the content indexer 202 may receive a request to sort a set of indices by source views 410 or publisher views 412, as further described in connection with FIGS. 5 and 6. The display logic generator 204 may generate logic based on the criteria or request given to the indexing processor 202. In alternative embodiments, there may be additional or fewer characteristics for which the display logic generator 204 may generate logic.

Referring back to FIG. 1, a user device 102 may access a content item through a URL or hyperlink provided on a web page hosted by a referral server 122. The link will redirect the user device 102 to the publishing server 106 where the content item is stored and/or hosted. The content indexer 112 monitors the referrals to the content item hosted on the publishing server 106 and may determine a characteristic associated with the referral server 122. In one embodiment, the content indexer 112 may determine an attribute associated with the referral server based upon information in the HTTP request, such as that the referral is from a social network or from a search engine. The indexer processor 202 may use this information to generate or update an index for that content item. The display logic generator 204 may generate logic for graphically displaying aspects of the index. In another embodiment, a user may click a button on the graphical interface to request that content indexer 112 display index information relating to one or more content property classifications 301. In additional embodiments, a user may also click a button on the graphical interface to display or sort the indices by one or more display logics 401. In various embodiments, such as those shown in FIGS. 7 through 11, some or all of the visual elements may be interactive and may be configured to allow the user to quickly and efficiently organize the index values according to their needs. In any event, the display logic generator 204 generates logic for displaying the indices in accordance with the user requests. As further described with respect to FIGS. 5 and 6, the indices may be generated to indicate the performance of a content item, such as the content item's virality or newsworthiness.

Figure 5:
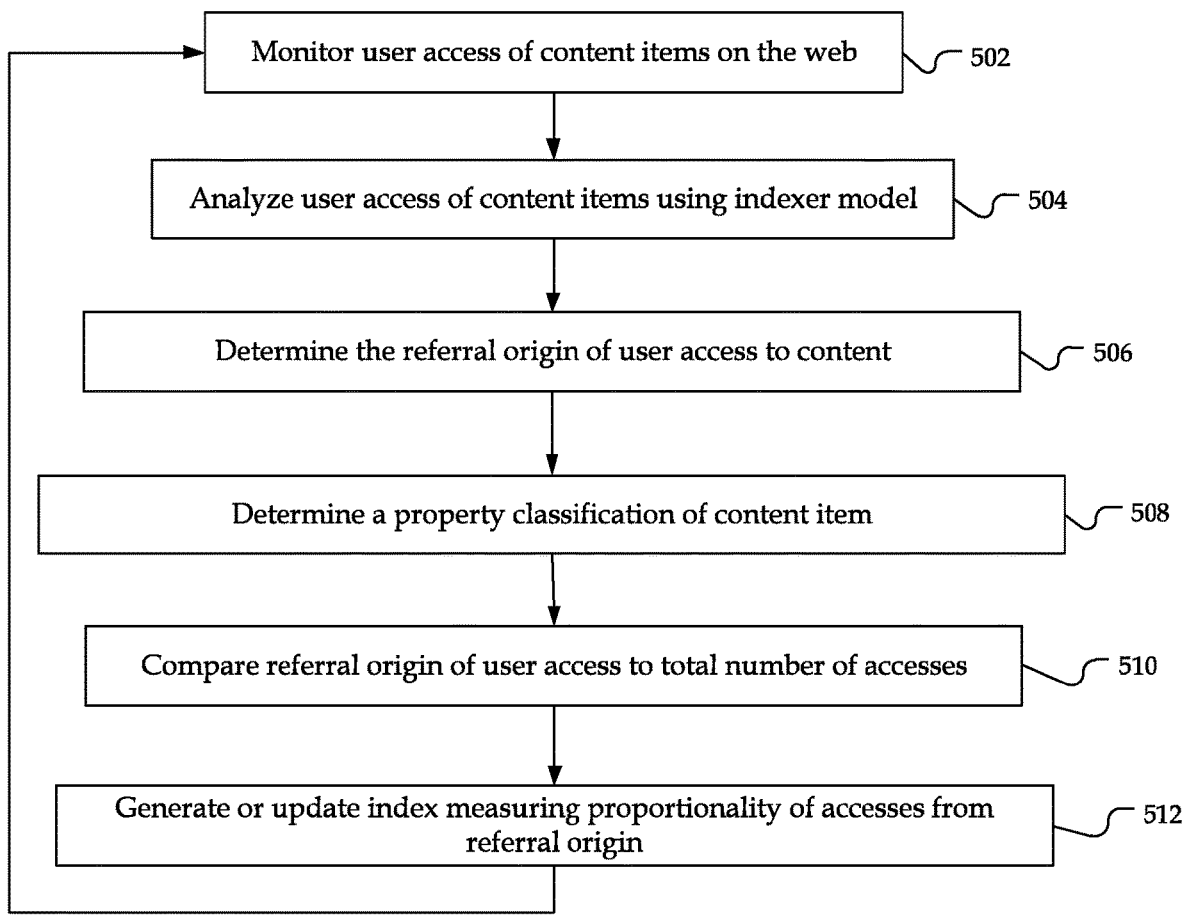
FIG. 5 is a flow diagram of an exemplary method of generating an index measurement of the performance of a content item.

FIG. 5 is a flow diagram of an example method of generating an index measurement of the performance of a content item. In block 502, the user access requests to content items hosted on a publisher server are monitored and tracked. For example, content items may be stored in a publisher database and hosted by the publisher on their server or on an electronic source (such as the webpage). Users may utilize the Internet to navigate to content items in various ways. For example, users may navigate to a search engine and may enter a keyword search. The search engine may return a list of results in the form of hyperlinks (links), which may be references to content items or webpages hosted on various publisher servers. The user may click a link and be transferred to a page hosted on a publisher website and containing the content item. In another example, the user may be browsing a social media network. The user may click a link that one of the users within their network has shared or posted to the network. When the user clicks on the link, the user may likewise be transferred to a page hosted on a publisher website containing a content item. The access request may contain information about the nature of the referral site, for example, in HTTP request. The way a user may access a content item is not limited. In alternative embodiments, the content item may be accessed from within the social network and displayed as embedded content directly on the social networking site, or various other ways for a user to view and access a content item or webpages containing a content item.

Additionally, once a user has navigated to a content item, the user may share the content from the electronic source (such as the webpage) with friends or other users, such as by posting, sending, or otherwise sharing with other users an identifier for the electronic source (such as a URL address or other address of a webpage). For example, the user may copy the identifier (such as a URL address) and post the identifier to a message board or social networking site, or email or text the identifier to one or more friends or other users. Alternatively, the electronic source or webpage may include a link that allows the user to directly post, repost, send, or otherwise share the content item. Recipient users, such as other users within the social network, may interact with the identifier (such as by clicking on the link or otherwise pasting a URL address into a browser) and access the content from the electronic source. The recipient users may, in turn, share this content with still other users in the same or various other ways. Other examples are envisioned and the aforementioned examples are not intended to be exhaustive.

In block 504, the requests for user access to a content item are being monitored and an access request is received. The indexer analyzes the access request and may determine one or more variables associated with the request and/or content item accessed. For example, in block 506, the origin or referral server of the user access request may be determined. As previously discussed, it may be determined which domain names are referring traffic to the content item, or that the origin is, for example, a search engine link or URL displayed on a social network page. In alternative embodiments, a keyword used in a search engine query associated with the referral traffic may be determined. At block 508, the indexer may further determine one or more property classifications associated with the content item. In one embodiment, the property classifications, such as those described in connection with FIG. 3, may be used to organize or sort index information based on a comparison to other content items having one or more similar properties. At block 510, the indexer may account for the access origin determined in block 506 in order to compare the total number of views or access attempts from the given origin to the total number of views or access attempts from other origins. At block 512, the indexer generates an index or measurement based, in part, on the proportionality of access attempts from a given origin. Also at block 512, the indexer may update one or more previously generated indices based on new access request data. In one embodiment, the indexer may generate or update an index using a formula that compares the views originating from search engines to the total views from all sources in order to determine a proportionality measurement for the views originating from the search engine (i.e. Search Virality Index). For example, the indexer may use the following formula to generate the Search Virality Index for a given content item:

Search Virality Index=((# of Search Engine Views)*100)/((Total Page Views)−(# of Search Engine Views)). This is merely one embodiment of a calculation of the index and other variations are possible.

The indexer may use the Search Virality Index as part of an additional measurement in order to generate an index score representing the performance of the content item in terms of user access requests for a given time period. For example, in one embodiment, the indexer may use the following formula to determine a measurement of the overall performance a content item for a given hour of the day with respect to searches originating from a search engine (i.e. Search Y!Ral Index):

Search Y!Ral Index=(Boost Factor Constant)*(Search Virality Index)*((Total Search Engine Views for the Article)$^K$)/(Total Search Engine Views in the Given Hour), where K is a constant used to control for inherent biases (e.g. K may be 2 or increased if a website is prone to greater inherent bias). This is merely one embodiment of a calculation of the index and other variations are possible.

In additional embodiments, the method for generating indices may take into account further considerations and may be adapted to suit the needs of the particular user. For example, some content items may be displayed on webpages that are inherently biased in access requests, such as provider landing pages or home pages that are necessarily accessed by large numbers of users navigating to a particular domain. The method of FIG. 5 may be adapted to account for such inherent biases or similar considerations as may be necessary. For example, in some embodiments the Boost Factor Constant or constant K may be adjusted (e.g. increased) to account for degree of inherent biases present with the content item.

In further embodiments, the method of FIG. 5 for generating indices may be adapted to differentiate between referrals and explicit shares. For example, in addition to considering the referral origin of the access request, the method of FIG. 5 may be adapted to account for the number of access requests to a content item that resulted from, or resulted in, a user explicitly sharing the content item on a social network.

Figure 6:
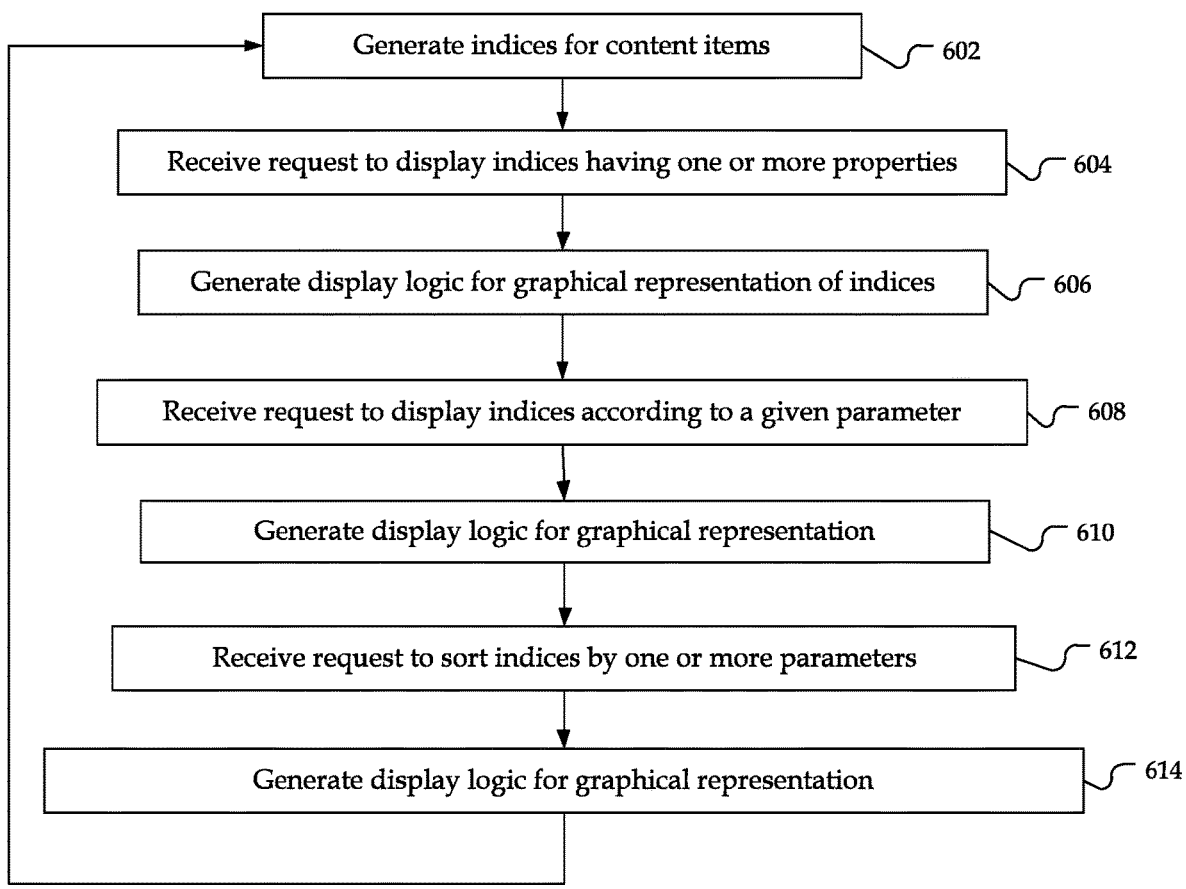
FIG. 6 is a flow diagram of exemplary method for utilizing the index measurement to generate graphical representations of the indices.

FIG. 6 is a flow diagram of an example method for utilizing the index measurement to generate graphical representations of the indices. At block 602, the indices for one or more content items are generated. In one embodiment, the indices may be generated according the method outlined in FIG. 5. In alternative embodiments, the method for generating indices may take into account additional considerations and may be adapted to suit the needs of the user.

Figure 7:
FIG. 7 shows an exemplary graphical representation of content item property classifications.

At block 604, the indexer may receive a request to display indices having a certain property value. For example, a user may be shown a list or graphical representation of a set of properties. The user may click on one of the elements of the graphical representations or otherwise indicate an intention to select one or more property classifications. FIG. 7 depicts an exemplary graphical representation of visual elements for a set of properties or classifications. In one embodiment, a user may select a property classification, such as Sports, by clicking on the graphical representation or visual element associated with that property in order to cause the indexer to generate graphical representations of the indices sharing that property or classification.

Referring back to FIG. 6, at block 606, when a user clicks on a property classification, the indexer may cause logic to be generated for displaying a graphical representation of the indices associated with the one or more content items. For example, in one embodiment, the indexer may cause logic to be generated displaying a list of content items and their respective index ratings. In another embodiment, the indexer may cause logic to be generated displaying a graph of the index values for one or more content items. The index values for the one or more content items may further be grouped according to a property classification, or based on the referral original as determined in block 506 of FIG. 5. In additional embodiments, the visual representations of indices may further be presented according to times associated with the with the access requests. For example, the user may click on a visual element associated with a particular hour of the day to cause the indexer to generate graphical representations of the indices for the various content items measuring access requests during that hour. Importantly, the examples described herein are meant to be non-exhaustive and are provided without limitation. Various embodiments may use fewer or additional criteria to display the graphical representations or may combine one or more criteria in a single embodiment.

At block 608, the indexer may receive a request to display the indices according to a given parameter, such as an interval of time. In one embodiment, the user may request that the indices to be displayed according to hour, day, week, or month. In additional embodiments, the indices may be displayed according additional criteria associated with the visual elements. For example, a user may click on one or more visual elements of the graphical representation to indicate an intent to display a list of indices having an attribute associated with the visual element. At block 610, the indexer may cause additional logic to be generated in order to display a graphical representation of the indices according to the given attribute or property associated with the respective visual element. At block 612, the indexer may receive a request to sort the indices according to a given parameter. For example, the user may click on a visual element to send a request for the indexer to sort the indices according to index values from high-to-low or from low-to-high. At block 614, the indexer may cause additional logic to be generated for displaying a graphical representation of the indices according to the request to sort the indices by numerical ranking.

Figure 8:
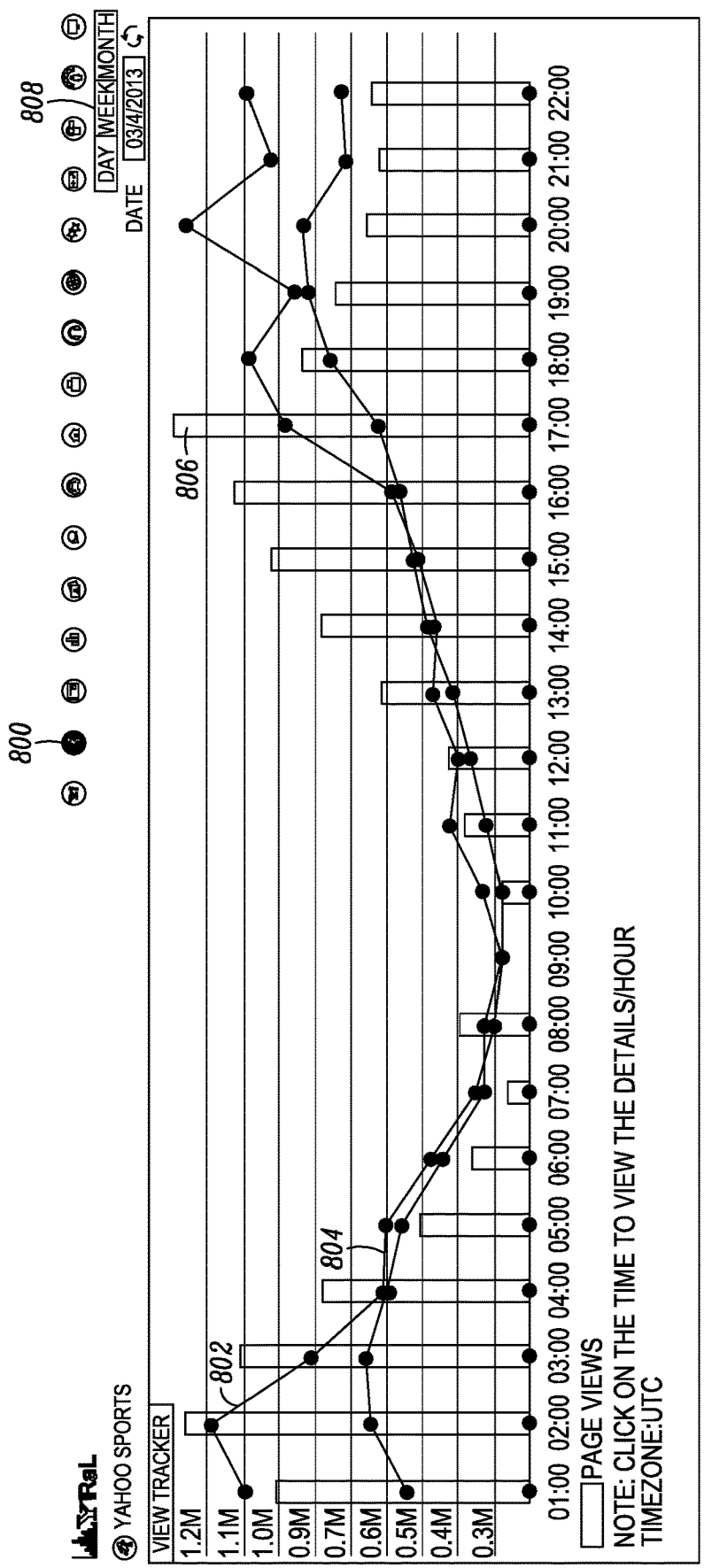
FIG. 8 shows an exemplary graphical representation of content item access requests based on access origin.

FIG. 8 is an exemplary graphical representation of content item access requests based on access origin. In particular, FIG. 8 depicts one embodiment in which visual elements have been generated representing the indices sharing the "Sports" property. In this embodiment, the visual element 800 representing content items sharing the "Sports" property has been selected. Visual elements have been generated as line graphs with individual lines representing index measurements based access origin. For example, line 802 may depict index measurements for content items based on access requests received from a search engine. Line 804 may depict index measurements for content items based on access requests received from a social network. The bar graphs, such as bar graph 806, may represent total access requests regardless of origin. In this embodiment, each point of the line graphs and each bar graph represent access views for a given hour of the day. In additional embodiments, the graphs may be sorted other time intervals such as day, week, or month as may be selected via clicking on the corresponding portion of element 808. As explained above, any of the visual elements of FIG. 8 may also be selected or clicked by a user in order to generate further graphical representations of the index measurements for one or more content items. The interface may be further customized in order facilitate efficient review by a user wishing determine the performance of a content item.

Figure 9:
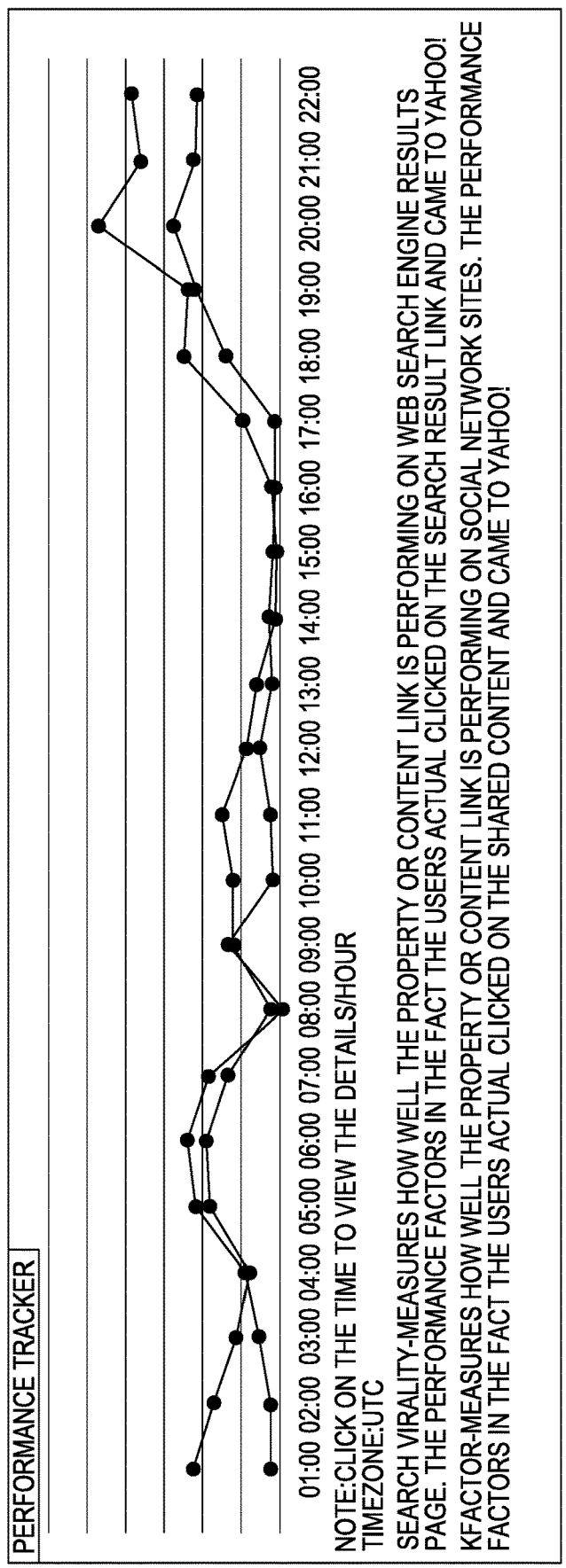
FIG. 9 shows an exemplary graphical representation of the indices or performance of content items.

FIG. 9 is an exemplary graphical representation of the index measurements or performances of one or more content items. In particular, FIG. 9 depicts one embodiment where the index values of content items have been compared and are displayed based on two criteria. In this embodiment, the line graph acts as visual representation of the performance of the content items and allows the user to compare the performance with respect to two selected attributes or properties. For example, in an embodiment implemented according to the method of FIG. 5, as part of the line graph the performance tracker may display two lines, one depicting the Y!Ral Index value for views originating from a search engine (i.e. Search Y!Ral Index) and the other depicting the Y!Ral Index value for views originating from a given social networking site (i.e. Social Y!Ral Index). If the user determines, for example, that at a certain point in time, the Y!Ral Index value for the social networking site steeply increases, then the user may be able to determine that the content item has gone viral on within a given social network.

Referring back to FIG. 9, in this embodiment, each point of the line graphs represent performance for a given hour of the day. In additional embodiments, the graphs may be sorted by other time intervals, such as day, week, or month. In further embodiments, including those depicted in FIGS. 7 through 11, some or all of the visual elements may be interactive and may be configured to allow the user to quickly and efficiently organize the index values according to their needs.

FIGS. 10A-B are an exemplary graphical representation of the top performing index measurements for content items within a given property classification. For example, in one embodiment implemented according to the method in FIG. 5, the performance of an index may use the Search Y!Ral Index score generated by the indexer. Referring back to FIGS. 10A-B, in this embodiment, the index measurements for content items having the property classification "Sports" have been graphically represented as lists. In particular, the index measurements have been graphically represented as two separate lists based on access origin. For example, list 1002 may display one or more indices generated based on access requests or referrals received from search engines. List 1004 may display one or more indices generated based on access requests or referrals received from social networks. The indices may be displayed based upon the values for the top performing links, or content items with the highest Y!Ral Index value. Additionally, visual elements may be graphically represented that allow the user to sort the index ratings for each content item by additional criteria. Additional embodiments may allow sorting of index ratings from low-to-high, or high-to-low, or the like. For example, FIGS. 11A-B are exemplary graphical representations of one embodiment where visual elements for the lowest performing index measurements are graphically displayed for content items within a given property classification. Importantly, the figures described herein are to be regarded as illustrative rather than restrictive. Alternative embodiments may account for one or more of the features depicted in the figures or may provide additional criteria for utilizing and displaying graphical representations of the index measurements.

The methods disclosed herein may allow users, such as website producers or advertisers, to more efficiently determine which content items are most likely to attract viewers or be shared by users of a social network. As content items receive more views, and in turn receives more shares within various social networks or gains, the content may reach a point where the content goes viral and exponentially increases in user access requests.

An advertiser or website producer may have interest, financial or otherwise, in determining which content item is more likely to be accessed and shared with other users than a website that has been accessed by comparatively fewer users. For example, given the growth in and importance of online advertising as a source of revenue for enterprises engaged in electronic commerce, many online advertisers would benefit from associating their advertisements with content items that have gone viral. Specifically, in instances where the social attributes of a user are difficult to determine, it may be particularly beneficial to associate advertisements with content items that have gone viral or are otherwise most likely to be viewed by users. The methods disclosed herein allow providers of content items to more efficiently track, monitor, and determine when particular content items are likely to go viral and thus which content items are best suited for advertising monetization. Additionally, the providers may more efficiently determine which content item should be displayed on frequently accessed webpages in order to best increase page traffic.

The benefits of advertising monetization may be realized in a number of ways. For example, advertising may include sponsored search advertising, non-sponsored search advertising, guaranteed and non-guaranteed delivery advertising, ad networks/exchanges, ad targeting, ad serving, and/or ad analytics. Various monetization techniques or models may be used in connection with sponsored search advertising, including advertising associated with user search queries, or non-sponsored search advertising, including graphical or display advertising. In an auction-type online advertising marketplace, advertisers may bid in connection with placement of advertisements, although other factors may also be included in determining advertisement selection or ranking. Bids may be associated with amounts advertisers pay for certain specified occurrences, such as for placed or clicked-on advertisements, for example. Advertiser payment for online advertising may be divided between parties including one or more publishers or publisher networks, one or more marketplace facilitators or providers, or potentially among other parties.

Some models may include guaranteed delivery advertising, in which advertisers may pay based at least in part on an agreement guaranteeing or providing some measure of assurance that the advertiser will receive a certain agreed upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goal(s). For example, models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. Accordingly, the invention is not to be restricted except in light of the attached claims and their equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

We claim:

1. A system for measuring a virality of content items on a network, the system comprising:
    a publisher server for providing a page comprising a content item, the page provided in response to a referral from at least one of a referral server or a social media website, the referral for providing user remote access to the content item;
    an indexer for tracking behavior associated with content items, the indexer comprising a processor configured to:
        monitor user access requests for the content item at the publisher server, at least a portion of the user access requests comprising a plurality of referrals for the content item;
        determine a plurality of origin servers of the plurality of referrals for the content item;
        identify that the plurality of origin servers comprise social media network servers;
        determine that the plurality of referrals are a result of a plurality of explicit shares of the content item on a plurality of social media networks associated with the social media network servers;
        determine a first number of accesses of the content item as a result of the plurality of explicit shares of the content item on the plurality of social media networks;
        determine a total number of accesses of the content item from all sources; and
        generate a virality index score for the content item comprising a proportion of the first number of accesses compared to the total number of accesses; and
    a logic generator for generating a graphical representation of a web page based upon the virality index score.

2. The system of claim 1, wherein the indexer is further configured to determine an attribute property associated with the content item.

3. The system of claim 2, wherein the attribute property comprises one or more of sports, news, business, social websites, entertainment, travel, automobile, video, lifestyle, tabloid, knowledge market, or geographic features.

4. The system of claim 1, wherein the graphical representation is a line graph, a bar graph, or a sortable list.

5. A non-transitory computer readable medium having stored therein data representing instructions executable by a programmed processor for measuring a virality of web content, the instructions for tracking behavior associated with content items and operative for:
    monitoring access requests for a web content item;
    identifying when the web content item has received an access request by a remote network resource;
    determining an origin server for the access request for the web content item;
    determining an origin property associated with an origin of the access request;
    determining a first number of access requests for the web content item from the origin server;
    determining a total number of access requests for the web content item from all sources;
    determining a degree of inherent bias associated with the origin server;
    determining a performance measurement of the web content item comprising a proportion of the first number of access requests compared to the total number of access requests for the web content item and altered by a factor relating to the degree of inherent bias associated with the origin server; and
    generating a visual element corresponding to the performance measurement.

6. The non-transitory computer readable medium of claim 5, wherein the origin property associated with the origin is a type of website referring the access request.

7. The non-transitory computer readable medium of claim 6, wherein the type of website is a search engine or social networking site.

8. The non-transitory computer readable medium of claim 5, further comprising instructions operative for determining an attribute property associated with the web content item.

9. The non-transitory computer readable medium of claim 8, wherein the attribute property comprises one or more of sports, news, business, social websites, entertainment, travel, automobile, video, lifestyle, tabloid, knowledge market, or geographic features.

10. The non-transitory computer readable medium of claim 5, wherein the visual element comprises a line graph, a bar graph, or a sortable list.

11. A computer-implemented method for tracking behavior associated with content items, comprising:

monitoring access requests for a content item at a publishing server;
identifying when the content item has received an access request by a remote network resource;
determining an origin server for the access request for the content item;
determining an origin property associated with an origin of the access request;
determining a first number of access requests for the content item from the origin server;
determining a total number of access requests for the content item from all sources;
determining a degree of inherent bias associated with the origin server;
determining a virality measurement of the content item comprising a proportion of the first number of access requests compared to the total number of access requests for the content item and altered by a factor relating to the degree of inherent bias associated with the origin server; and
generating a visual element corresponding to the virality measurement.

12. The computer-implemented method of claim 11, further comprising determining an attribute property associated with the content item.

13. The computer-implemented method of claim 12, wherein the attribute property is one or more of sports, news, business, social websites, entertainment, travel, automobile, video, lifestyle, tabloid, knowledge market, or geographic features.

14. The computer-implemented method of claim 11, wherein the origin property associated with the origin of the access request is a type of webpage referring the access request.

15. The computer-implemented method of claim 14, wherein the type of webpage is a search engine or social network.

16. The computer-implemented method of claim 11, wherein the visual element comprises a line graph, a bar graph, or a sortable list.

17. The system of claim 1, wherein the indexer is further configured to determine a degree of inherent bias associated with at least one of the plurality of origin servers.

18. The system of claim 17, wherein the virality index score is further based upon the degree of inherent bias.

19. The non-transitory computer readable medium of claim 6, wherein the type of website is a search engine.

20. The computer-implemented method of claim 14, wherein the type of webpage is a search engine.

* * * * *